UNITED STATES PATENT OFFICE.

WILLIAM H. EAVES, OF SAN AUGUSTINE, TEXAS, ASSIGNOR TO HIMSELF AND ARCHIBALD C. HOLMES, OF SAME PLACE.

MEDICAL COMPOUND.

SPECIFICATION forming part of Letters Patent No. 250,222, dated November 29, 1881.

Application filed April 27, 1881. (No specimens.)

*To all whom it may concern:*

Be it known that I, WILLIAM H. EAVES, of San Augustine, in the county of San Augustine and State of Texas, have invented a new and Improved Compound for Curing Rheumatism and Neuralgia, of which the following is a full, clear, and exact description.

My compound consists of the following ingredients combined in the proportions stated, to wit: whisky, thirty-two ounces; gum-guaiacum, one ounce; bromide of potassium, one dram; nitrate of potassium, two drams; wine of ipecacuanha, two fluid drams. Dose, one table-spoonful three times daily.

I am aware that gum-guaiacum and nitrate of potassa have been used separately and together, and also that the former has been administered in an alcoholic (brandy) solution, as remedies for rheumatism and neuralgia.

Having thus described my invention, I claim as new and desire to secure by Letters Patent—

The herein-described compound, to be used for curing rheumatism and neuralgia, consisting of whisky, gum-guaiacum, bromide of potassium, potassium nitrate, and wine of ipecacuanha, in about the proportions specified.

WILLIAM HADSIL EAVES.

Witnesses:
E. A. BLOUNT,
S. W. BLOUNT.